(12) United States Patent
Castaldi et al.

(10) Patent No.: US 6,235,204 B1
(45) Date of Patent: May 22, 2001

(54) METHOD AND SYSTEM FOR REMOVAL OF SELENIUM FROM FGD SCRUBBER PURGE WATER

(75) Inventors: Frank J. Castaldi; Gregory P. Behrens; Oliver W. Hargrove, Jr., all of Austin, TX (US)

(73) Assignee: Radian International LLC, Austin, TX (US)

( * ) Notice: Subject to any disclaimer, the term of this patent is extended or adjusted under 35 U.S.C. 154(b) by 0 days.

(21) Appl. No.: 09/549,757

(22) Filed: Apr. 14, 2000

Related U.S. Application Data

(60) Provisional application No. 60/129,424, filed on Apr. 15, 1999.

(51) Int. Cl.[7] ............................................. C02F 1/70
(52) U.S. Cl. ..................... 210/719; 210/721; 210/723; 210/724; 210/726; 210/757; 210/758; 210/767; 210/806
(58) Field of Search ..................... 210/719, 721, 210/723, 724, 726, 749, 757, 758, 767, 806

(56) References Cited

U.S. PATENT DOCUMENTS

| | | |
|---|---|---|
| 4,806,264 | 2/1989 | Murphy . |
| 4,935,146 * | 6/1990 | O'Neill et al. . |
| 5,200,082 * | 4/1993 | Olsen et al. . |
| 5,853,598 * | 12/1998 | Ogoshi et al. . |
| 5,993,667 * | 11/1999 | Overman . |

OTHER PUBLICATIONS

Moody et al., Pan–American Regional Conference, 1989 p. 110–129.

* cited by examiner

Primary Examiner—David A. Simmons
Assistant Examiner—Betsey Morrison Hoey
(74) Attorney, Agent, or Firm—Klauber & Jackson

(57) ABSTRACT

A method for removing the oxy-anions of selenium from FGD scrubber purge water. The purge water is contacted with free hydroxyl radicals to effect oxidation of reduced forms of sulfur to sulfate and the destruction of sulfur-nitrogen compounds present in the purge water. The purge water is then subjected to chemical reduction and co-precipitation of selenium with an amount of ferrous ions effective to remove the oxy-anions of selenium in the liquid in less than 30 minutes of reaction time. The resultant ferrous-selenium solids generated are separated and stabilized to elemental selenium in a separate reaction vessel.

12 Claims, 2 Drawing Sheets

US 6,235,204 B1

METHOD AND SYSTEM FOR REMOVAL OF SELENIUM FROM FGD SCRUBBER PURGE WATER

This application claims the benefit of provisional application Ser. No. 60/129,424, filed Apr. 15, 1999.

FIELD OF THE INVENTION

This invention relates generally to methods and apparatus for removing undesirable metallic ions from aqueous streams. More specifically the invention relates to a process and system for the chemical reduction and co-precipitation of selenium and the stabilization of the resultant selenium solids generated during the treatment of purge waters that are produced in a limestone-based flue gas desulfurization (FGD) scrubber typical of most coal-fired electric power utilities.

BACKGROUND OF THE INVENTION

In the limestone-based flue gas desulfurization (FGD) scrubber typical of most coal-fired electric power utilities, the limestone is used in the scrubbing process to remove combustion by-products during steam generation. Sulfur dioxide is the primary target of this scrubbing process and is produced when coal with high sulfur content is burned in the boilers. The selenium that is derived from the particular coal used as fuel to the boilers will be found in fly ash, flue gas emissions, scrubber solids, and in the scrubber liquids. Additionally other heavy metals will accumulate in the scrubber water. The selenium concentrations found in FGD scrubber liquids will vary from 0.5 to several parts per million (ppm).

The present invention is a process and system that will remove selenium from water that contains high concentrations of dissolved solids, and is an improvement upon the method disclosed in U.S. Pat. No. 4,806,264 (Feb. 21, 1989). The method described in U.S. Pat. No. 4,806,264 uses the ferrous ion to reduce the oxy-anions of selenium (i.e., selenate [$SeO_4^{2-}$] and selenite [$SeO_3^{2-}$]) to elemental selenium ($Se^\circ$) and co-precipitates the selenium with the resultant ferrous and ferric hydroxide sludges produced during the reaction. However, the application of the method described in U.S. Pat. No. 4,806,264 has not been found satisfactory by the present inventors for the removal of the selenium present in FGD scrubber purge water. Typical FGD scrubber liquids contain high concentrations of calcium, magnesium, sulfate, and total dissolved solids (TDS). With certain coals, the TDS will contain high concentrations of chlorides, on the order of 15,000 to 20,000 ppm, as chloride. In addition, this purge water may contain reduced forms of sulfur such as sulfite ($SO_3^{2-}$), thiosulfate ($S_2O_3^{2-}$), bisulfite ($HSO_3^-$), metabisulfite ($S_2O_5^{2-}$), dithionate ($S_2O_6^{2-}$), trithionate ($S_3O_6^{2-}$), and tetrathionate ($S_4O_6^{2-}$); organic acids such as adipic, glutaric, and succinic acids; and sulfur-nitrogen compounds such as hydroxylamine disulfonate (HADS), hydroxylamine sulfonate, and amine disulfonate. The sulfur-nitrogen compounds are formed through a reaction between the $NO_2$ and $SO_2$ absorbed from boiler flue gas.

SUMMARY OF THE INVENTION

After extensive study of the treatment method described in U.S. Pat. No. 4,806,264 and its application to FGD scrubber purge water, it was determined that the presence of certain reduced sulfur species, selenium-thionate complexes, sulfur-nitrogen compounds, and the concentration of ferrous ion available for reaction impacted the treatment performance. Specifically, the reduced sulfur species present in FGD scrubber purge water that most inhibit ferrous ion reduction of the oxy-anions of selenium are sulfite, bisulfite, and thiosulfate. To a lesser degree, inhibition also results from the formation of selenium-thionate complexes such as the selenopentathionate [$Se(S_2O_3)_2^{2-}$] and/or selenotrithionate ions, which serve to increase the concentration of dissolved selenium unavailable for reduction by the ferrous ion. Selenium will also complex directly with thiosulfate to form selenothiosulfate ($SeS_2O_3^{2-}$). However, the sulfur-nitrogen compounds were found to be the most inhibiting constituents in FGD scrubber purge water. Specifically, the sulfur-nitrogen compound, HADS, was found to severely reduce the rate at which the oxyanions of selenium could be reduced with the ferrous ion, resulting in incomplete treatment and noncompliance with established effluent discharge limitations. In all cases, the inhibiting constituents impacted the apparent rate of selenate/selenite reduction in FGD purge water and resulted in an increase in the required dosage of ferrous ion needed to achieve the target effluent selenium concentration, as defined by the government regulatory agency. This apparent retardant effect on the rate of selenium oxy-anion reduction was believed to be indicative of a competitive inhibition.

The inhibiting constituents ($O_2$, $NO_3^-$, $HCO_3^-$, $Ca^{2+}$, $Mg^{2+}$) cited by Moody and Murphy (1989) in their paper on treating toxic substances in agricultural water supply and drainage, Selenium Removal with Ferrous Hydroxide: Identification of Competing and Interfering Solutes, (Pan American Regional Conference—1989) were determined to either not be present or to be a minor influence on the rate of selenium oxy-anion reduction when actual FGD scrubber purge waters were treated with the present invention. More specifically, it was verified that the ferrous ion chemical reduction reaction described above must be conducted under strict anaerobic conditions, without nitrate present, and at optimum ferrous ion dose levels for the reactions to proceed to completion in a reasonable time period (e.g., less than 6.0 hours). Air will stop the reduction of selenate and selenite to elemental selenium by oxidizing the ferrous ion reducing agent, and nitrate will be reduced to ammonia and nitrite preferentially over the reduction of the selenium oxy-anions. Fortunately neither oxygen nor nitrate is present at significant concentrations in typical FGD scrubber purge waters. Moreover, the influence of these inhibitors is easily overcome by the addition of excess ferrous ion, providing that the sulfur-nitrogen compounds and/or reduced sulfur species are removed to acceptable levels by the appropriate pretreatment. The components of hardness (i.e., $HCO_3^-$, $Ca^{2+}$, $Mg^{2+}$), albeit present at high concentrations in typical limestone-based FGD scrubber purge waters, were found to have minimal impact on the removal of the oxy-anions of selenium with the present invention. Experimental investigations conducted by the inventors produced data which indicated that the ferrous ion reactions were most optimum when the measured oxidation-reduction potential (ORP) of the process was more negative (usually between −650 and −750 mV). It also was determined that low to medium levels of sulfite, sulfide, thiosulfate, and possibly bisulfite would retard the selenium removal reaction rate. Moreover, when any of these reduced sulfur species were present at high concentrations in the FGD scrubber purge water and HADS was also present, the removal of selenium, primarily as selenate, would stop completely.

Experimental investigations also determined that it was possible to effect improved removal of selenium from the FGD scrubber purge waters at a short hydraulic retention time by using a plug-flow reaction vessel coupled with continuous sludge separation. It also was determined that once the selenium-iron solids were separated from the treated wastewater, the collected solids (i.e., sludges) could be stabilized in a separate reaction vessel to prevent the desorption of reduced forms of selenium back into the liquid stream. This stabilization reaction vessel is designed to complete the reduction of all oxidized forms of the selenium (e.g., selenate and selenite) in the purge water to elemental selenium and to guarantee that the selenium co-precipitated with iron oxyhydroxide would remain stable. This lead to the development of the reduction/co-precipitation-stabilization process described in the invention.

Thus the present invention represents a substantial improvement upon the process of U.S. Pat. No. 4,806,264, and optimizes treatment of limestone-based FGD scrubber purge waters to remove the oxy-anions of selenium either with or without the presence of calcium sulfate and sulfite solids. This process may also be applicable to the treatment of other industrial wastes that contain selenium in the presence of reduced sulfur species and selenium-thionate complexes (e.g., petroleum refining and petrochemical wastewaters).

DETAILED DESCRIPTION OF THE INVENTION

Figure 1:
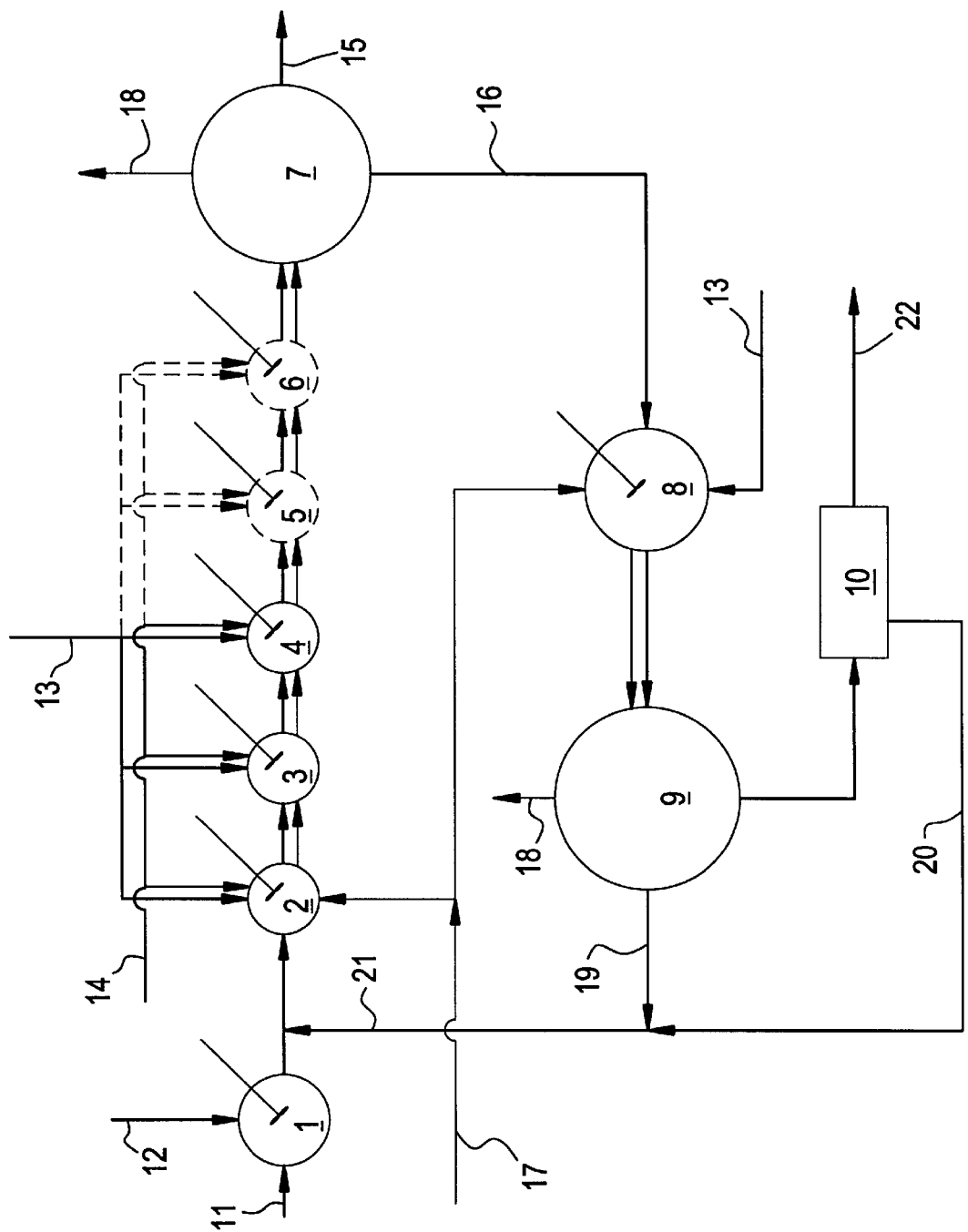
FIG. 1 is a schematic block diagram of a selenium removal system operating in accordance with the principles of the present invention.

In FIG. 1 a schematic block diagram appears of a basic system 30 operating in accordance with the invention. While system 30 will be described particularly in connection with its application to treatment of FGD scrubber purge waters to remove selenium either with or without the presence of calcium sulfate and sulfite solids, the process and system of the invention may also be applicable to the treatment of other industrial wastes that contain selenium in the presence of reduced sulfur species (e.g., petroleum refining and petrochemical wastewaters).

FGD scrubber purge wastewater 11 is initially provided to a pretreatment reactor 1 to effect reduced sulfur species oxidation and HADS destruction. This pretreatment uses the free hydroxyl radical as the principal oxidizing species 12 to achieve the oxidation of sulfite, bisulfite, sulfide, thiosulfate and other reduced forms of sulfur to sulfate, and the destruction of sulfur-nitrogen compounds, specifically HADS, in the FGD scrubber purge wastewater 11. There are three well-known methods for generating hydroxyl radicals without using light energy. Two of the methods involve the reaction of ozone at either high pH or with hydrogen peroxide, while the third uses the ferrous ion with hydrogen peroxide. The reaction of the ferrous ion with hydrogen peroxide is known as Fenton's Reaction. It is preferred that the free hydroxyl radical be applied in the form of Fenton's Reagent because this is more consistent with the overall use of the ferrous ion for reduction and co-precipitation of the oxy-anions of selenium. Pretreatment using the free hydroxyl radical can be conducted at a pH between 1.0 and 4.0, but is most optimal at a pH about 3.0 to 4.0 for purge waters from limestone-based FGD scrubbers. A preferred temperature is from about 40 to 50° C. Free hydroxyl radical doses that were observed to be most effective at removing inhibitory compounds from FGD scrubber purge water were between 20 and 30 mM/L. Alternatively, the pretreatment may employ oxidizing agents with the formula $Na_aClO_b$. Specific preferred compounds include chlorine dioxide ($ClO_2$), sodium hypochlorite (NaClO), sodium chlorite ($NaClO_2$), and sodium chlorate ($NaClO_3$), with the preferred oxidizing agent being sodium hypochlorite. Pretreatment using oxidizing agents of the formula $Na_aClO_b$ can be conducted at a pH between 5.0 and 7.0, but is most optimal at a pH about 5.7 to 6.5 for purge waters from limestone-based FGD scrubbers. The dosages of oxidizing agents of the formula $Na_aClO_b$ that were most effective at removing inhibitory compounds from FGD scrubber purge water were between 5 and 10 mM/L. Oxidizing agents of the formula $Na_aClO_b$ are preferred with the pretreatment of FGD scrubber purge waters that contain high background concentrations of chlorides because such oxidants are less expensive than Fenton's Reagent or other sources of the free hydroxyl radical. However, oxidizing agents with the formula $Na_aClO_b$ are more appropriate for the oxidation of sulfite, bisulfite, sulfide, thiosulfate and other reduced forms of sulfur, than when applied to the destruction of sulfur-nitrogen compounds.

Reduction/co-precipitation reactors [i.e., a cascade of continuous-flow stirred tank reactors (CFSTR)]2, 3, 4, 5, and 6 are used to achieve the reduction, co-precipitation and flocculation of selenium species and other heavy metals in the purge water stream with ferrous and ferric hydroxide sludges. The reduction/co-precipitation reactors are typically short retention time reactors that continuously treat the full purge water stream. The treatment requires from 20 to 60 minutes of contact time to accomplish the reduction/co-precipitation reaction. These reaction vessels are continuously sparged with an inert gas, preferably nitrogen, 17 to prevent oxygen from entering the reaction chamber and inhibiting the reduction of the selenate and selenite forms of selenium. The reactions are most optimal at a pH between 8.8 and 9.2. The pH is maintained by the addition of hydroxide ions 14 to the reaction vessels, usually as an alkali earth metal hydroxide such as sodium or calcium hydroxide. Alternatively or in combination with the addition of a hydroxide reagent, a sluiry of calcium sulfate and sulfite discharged directly from the FGD scrubber may be used for pH control. A ferrous salt 13 is added to the reaction vessels at concentrations between 10 and 40 mM/L. Suitable ferrous salts are ferrous chloride or ferrous sulfate (copperas). The reagents are preferably added in increments across the cascade of reaction vessels, but may also be added as a slug of reagent at the first reactor in the treatment train or to a single batch reaction vessel. The reactions may be conducted at temperatures between 25 and 50 degrees C., preferably greater than 35 degrees C. The rate of reaction was found to increase at temperatures greater than 35 degrees C. Ferrous chloride is the preferred form of the ferrous ion reagent for treatment of FGD scrubber purge waters that contain high concentrations of the chloride ion. The preferred source of ferrous chloride is from waste by-product liquor, which is produced during the removal of scale, oxides, and other impurities from metal surfaces by pickling with hydrochloric acid. Sulfuric acid-based pickle liquors are also acceptable for treatment of FGD scrubber purge wastewaters that do not contain high concentrations of chlorides. The use of pickle liquor is preferred because it provides both an inexpensive source of ferrous ions for treatment of FGD scrubber purge wastewater, and permits the concomitant treatment and disposal of a hazardous substance within the parameters of existing government laws and regulations. The pickle liquors are typically obtained from industrial production operations that may not be integrated with the steam-electric power generating industry. When the pickle liquor is obtained from sources separate and apart from the steam-electric power generating industry, the process of this invention serves the combined purposes of selenium removal and hazardous substance detoxification.

A sedimentation basin or clarifier 7 is used to separate the resultant selenium-iron sludges from the purge water stream. The solids loadings on the sedimentation basin are between 12 and 14 lbs./ft$^2$-day. Effluents from this basin go to discharge 15 and the spent inert gas 18 is purged from the system at this point. Sedimentation basin underflows 16 are between 5 and 10 wt. % solids. The clarifier underflow sludges are sent to the stabilization reactor.

A stabilization reactor (usually a single-stage CFSTR) 8 is used to achieve the complete reduction of the oxy-anions of selenium to elemental selenium in the sludges separated from the sedimentation basin/clarifier. This is an extended retention time reactor that treats only the sludges generated during full-stream treatment either with or without the presence of a slurry of calcium sulfate and sulfite solids. The stabilization reactor is needed to complete the reduction of selenate and selenite to elemental selenium. This transformation is accomplished by stabilizing the selenium-iron waste sludges from the sedimentation basin in a separate CFSTR for a period of 6 to 8 hours under anaerobic conditions at a pH between 8.8 and 9.2. This treatment is most optimal at a temperature greater than 35 degrees C. and at a hydraulic retention time of greater than 6 hours. The stabilization reactions may require that additional ferrous salt 13 be added at a dose of between 2 and 4 mM/L over the treatment period. An inert gas 17 is also added to this reaction vessel to guarantee continuous anaerobic conditions during the reaction period. Alternatively, the sludges may be stabilized by retention for an extended period of time in an off-line sludge thickener.

A sludge thickener 9 is used to separate and concentrate the stabilized sludges from the stabilization reactor. The solids loadings on the sludge thickener are between 18 and 22 lbs./ft$^2$-day. The underflow sludges from the thickener are between 10 and 15 wt. % solids. Effluents from the thickener are returned to the process for additional treatment through the reduction/co-precipitation reactors. Spent inert gas 18 is also purged from the system at this point. The thickened sludges are sent to a solids dewatering device 10 where additional water is separated as filtrate 20 and blended with thickener decant 19 and combined 21 with chemically oxidized purge water for further treatment in the reduction/co-precipitation reactors. The stabilized solids leave the system as ferrous-selenium sludge cake 22 that is between 35 and 50 wt. % solids. Alternatively, it was determined that the stabilized solids either as slurry from the stabilization reactor or sludge cake from the dewatering unit may be collected and returned to the first reduction/co-precipitation reactor and reacted at a low pH, preferably between pH 3.0 and 4.0, to release ferrous ions in such a manner as to make them available for additional selenate/selenite reduction. The recycle of a portion of the stabilized ferrous-selenium sludge was found to reduce the use of virgin ferrous reagent by between 75 and 85 percent. It was further determined that stabilized ferrous-selenium sludge could be purged from the treatment system at between 15 and 25 percent of the normal sludge production level without jeopardizing treatment performance. Recycle of stabilized ferrous-selenium sludge reduces the overall solids disposal requirement for the process by more than 75 percent.

EXAMPLES

The process of this invention will remove the oxy-anions of selenium from FGD scrubber purge water down to levels between 75 and 50 ppb in 30 to 50 minutes of reaction time and 2 to 3 hours of settling time. This process will treat influent selenium levels typical of FGD scrubber purge waters (e.g., 500 to 5000 ppb) either with or without calcium sulfate and sulfite solids present in the reaction slurry. It was further determined that the ferrous ion as ferrous hydroxide also removes other dissolved elements from FGD scrubber purge water. During selenate removal with ferrous sulfate reagent, greater than 99% of the influent nickel ($Ni^{2+}$) also was removed from the scrubber purge water.

Example 1

The data presented in Table 1 are test results for the reduction/co-precipitation portion of the reduction/co-precipitation-stabilization process when applied to the treatment of a noninhibiting FGD scrubber purge wastewater. The data indicate that treatment of a limestone-based forced oxidation process FGD scrubber purge water, which has no inhibiting constituents present, will result in the removal of approximately 99% of the selenium at an initial concentration of selenate-selenium of about 895 µg/L when 9.0 mM/L of ferrous ion is added to the wastewater. For the conditions listed in Table 1, selenium treatment required less than 30 minutes of reaction time and 120 minutes of sedimentation time at a pH between 8.8 and 9.2 and at a temperature greater than 35° C.

TABLE 1

Selenium Removal from FGD Scrubber Purge Water by Ferrous Ion Reduction/Co-precipitation with Sedimentatino of Solids

| Ferrous Iron Dose | Influent Selenium | Effluent Total Selenium | Effluent Dissolved Selenium | Influent Nickel | Effluent Total Nickel | Effluent Dissolved Nickel |
|---|---|---|---|---|---|---|
| 1.5 mM/L | 986 µg/L | 292 µg/L | 213 µg/L | 883 µg/L | 41.1 µg/L | 4.8 µg/L |
| 3.0 mM/L | 921 µg/L | 105 µg/L | 42.5 µg/L | 829 µg/L | 27.9 µg/L | 5.1 µg/L |
| 4.5 mM/L | 888 µg/L | 97.4 µg/L | 28.9 µg/L | 774 µg/L | 18.4 µg/L | <1.9 µg/L |
| 6.0 mM/L | 878 µg/L | 75.1 µg/L | 23.5 µg/L | 767 µg/L | 6.3 µg/L | <1.9 µg/L |
| 7.5 mM/L | 891 µg/L | 57.7 µg/L | 18.2 µg/L | 777 µg/L | 9.8 µg/L | 2.8 µg/L |
| 9.0 mM/L | 905 µg/L | 48.1 µg/L | 9.0 µg/L | 801 µg/L | 10.3 µg/L | 3.6 µg/L |

1 All treatments performed at a pH between 9.0 and 9.2.
2 Ferrous iron added as $FeSO_4$.
3 All treatments performed at 35° C.
4 Selenium was present as selenate ($SeO_4^{2-}$).
5 The treatment involved a batch reaction with ferrous sulfate for 30 minutes and 120 minutes of solids sedimentation after which samples were collected and preserved with nitric acid.
6 Measurements for the oxidation/reduction potential (ORP) and mixed liquor total suspended solids (TSS) during treatment were as follows:

| Ferrous Ion Dose | Oxidation Reduction Potential | Mixed Liquor Total Suspended Solids | TSS after 120 Minutes of Settling. |
|---|---|---|---|
| 1.5 mM/L | −630 mV | 925 mg/L | 85 mg/L |

TABLE 1-continued

Selenium Removal from FGD Scrubber Purge Water by Ferrous Ion Reduction/Co-precipitation with Sedimentatino of Solids

| | | | |
|---|---|---|---|
| 3.0 mM/L | −645 mV | 1350 mg/L | 220 mg/L |
| 4.5 mM/L | −718 mV | 1515 mg/L | 406 mg/L |
| 6.0 mM/L | −680 mV | 2360 mg/L | 432 mg/L |
| 7.5 mM/L | −745 mV | 1935 mg/L | 100 mg/L |
| 9.0 mM/L | −788 mV | 2125 mg/L | 62 mg/L |

Example 2

The data presented in Table 2 are test results for the stabilization portion of the proposed reduction/co-precipitation-stabilization process. The data indicate that ferrous ion treatment of typical forced oxidation process FGD scrubber purge water, with no inhibiting constituents present, will result in a stabilized ferrous-selenium sludge in 5 to 6 hours of reaction time at a pH between 9.0 and 9.2 and at a temperature greater than 35° C.

TABLE 2

Impact of Prolonged Sludge Retention on Selenium Removal from FGD Scrubber Purge Water

| Sample | Selenium Remaining in Filtered Liquid | Total Suspended Solids in Reactor | Sodium Sulfite Addition | Change in ORP |
|---|---|---|---|---|
| FGD Purge Water at T = 0 | 929 µg/L | — | 0.5 mM/L $SO_3^{2-}$ | — |
| FGD Purge Water at T = 60 min | 374 µg/L | 1,095 mg/L | 0 | −57 mV |
| FGD Purge Water at T = 120 min | 123 µg/L | 1,030 mg/L | 0 | −43 mV |
| FGD Purge Water at T = 180 min | 45.3 µg/L | 1,945 mg/L | 0 | −28 mV |
| FGD Purge Water at T = 240 min | 14.5 µg/L | 1,420 mg/L | 0 | −33 mV |
| FGD Purge Water at T = 300 min | 3.7 µg/L | 2,310 mg/L | 0 | −31 mV |
| FGD Purge Water at T = 360 min | 5.7 µg/L | 1,485 mg/L | — | −34 mV |

1 All tests conducted at between pH 9.0 and 9.2.
2 Ferrous Sulfate added at 228 mg/L (1.5 mM/L) at the beginning of each batch cycle.
3 All tests conducted at 35° C.
4 Selenium was present as selenate ($SeO_4^{2-}$) at approximately 1.0 ppm.
5 All samples were filtered and preserved with nitric acid before selenium analysis.
6 The ORP of the treatment reactors varied as follows:

| Sample | Maximum ORP | Minimum ORP |
|---|---|---|
| FGD Purge Water at T = 0 to 60 min | −780 mV | −723 mV |
| FGD Purge Water at T = 60 to 120 min | −772 mV | −729 mV |
| FGD Purge Water at T = 120 to 180 min | −748 mV | −720 mV |
| FGD Purge Water at T = 180 to 240 min | −756 mV | −723 mV |
| FGD Purge Water at T = 240 to 300 min | −749 mV | −718 mV |
| FGD Purge Water at T = 300 to 360 min | −752 mV | −718 mV |

Example 3

The data presented in Table 3 are test results for the influence of sulfite ($SO_3^{2-}$) concentration on the selenium removal performance of the reduction/co-precipitation-stabilization process for treatment of scrubber purge water. Sulfite appears to inhibit selenium removal from FGD scrubber purge water at concentrations greater than 0.5 mM/L.

TABLE 3

Impact of Sulfite on the Removal of Selenium from FGD Scrubber Purge Water

| Sample | Selenium Remaining in Filtered Liquid | Total Suspended Solids in Reactor | Sodium Sulfite Addition | Change in ORP |
|---|---|---|---|---|
| Without Solids Separation Test A | | | | |
| FGD Purge Water at T = 0 | 914 µg/L | — | 1.0 mM/L $SO_3^{2-}$ | — |
| FGD Purge Water at T = 60 min | 547 µg/L | 1,675 mg/L | 0.5 mM/L $SO_3^{2-}$ | −45 mV |
| FGD Purge Water at T = 120 min | 240 µg/L | 1,055 mg/L | — | −35 mV |
| Without Solids Separation Test B | | | | |
| FGD Purge Water at T = 0 | 929 µg/L | — | 0.5 mM/L $SO_3^{2-}$ | — |
| FGD Purge Water at T = 60 min | 374 µg/L | 1,095 mg/L | 0 | −57 mV |
| FGD Purge Water at T = 120 min | 123 µg/L | 1,030 mg/L | 0 | −43 mV |

1 All tests conducted at between pH 9.0 and 9.2.
2 Ferrous Sulfate added at 228 mg/L (1.5 mM/L) at the beginning of each batch cycle.
3 Test A was conducted at three times the initial sulfite level as Test B.
4 All tests conducted at 35° C.
5 Selenium was present as selenate ($SeO_4^{2-}$) at approximately 1.0 ppm.
6 All samples were filtered and preserved with nitric acid before selenium analysis.
7 The ORP of the treatment reactors varied as follows:

| Sample | Maximum ORP | Minimum ORP |
|---|---|---|
| Without Solids Separation Test A | | |
| FGD Purge Water at T = 0 to 60 min | −766 mV | −721 mV |
| FGD Purge Water at T = 60 to 120 min | −762 mV | −727 mV |
| Without Solids Separation Test B | | |
| FGD Purge Water at T = 0 to 60 min | −780 mV | −723 mV |
| FGD Purge Water at T = 60 to 120 min | −772 mV | −729 mV |

Example 4

The data presented in Table 4 are test results for the influence of sulfide ($S^{2-}$) on the selenium removal performance of the reduction/co-precipitation-stabilization process treating FGD scrubber purge water. The data indicate that sulfide will inhibit selenium removal at concentrations greater than 1.5 mM/L.

TABLE 4

Impact of Sulfide on Selenium Removal from FGD Scrubber Purge Water

| Reaction Time | Selenium Remaining with $S^{2-}$ Present | Oxidation-Reduction Potential with $S^{2-}$ Present | Sulfide Ion Specific Electrode | Selenium Remaining without $S^{2-}$ Present | Oxidation-Reduction Potential without $S^{2-}$ |
|---|---|---|---|---|---|
| 0 minutes | 939 μg/L | +68 mV | −85 mV | 1000 μg/L | +126 mV |
| 30 minutes | 872 μg/L | −340 mV | −359 mV | 815 μg/L | −685 mV |
| 60 minutes | 694 μg/L | −570 mV | −408 mV | 605 μg/L | −745 mV |
| 120 minutes | 418 μg/L | −640 mV | −545 mV | 260 μg/L | −775 mV |
| 180 minutes | 418 μg/L | −615 mV | −588 mV | 124 μg/L | −760 mV |
| 240 minutes | 440 μg/L | −642 mV | −622 mV | 49.9 μg/L | −753 mV |
| 300 minutes | 438 μg/L | −660 mV | −635 mV | 28.0 μg/L | −763 mV |
| 360 minutes | 425 μg/L | −650 mV | −638 mV | 21.5 μg/L | −770 mV |

1 All treatments performed at a pH between 8.8 and 9.1.
2 Ferrous iron added as $FeSO_4$ at 0.025 mM/L-min.
3 Sulfide added as $Na_2S$ at 0.025 mM/L-min where indicated.
4 All treatments performed at 35° C.
5 Selenium was present as selenate ($SeO_4^{2-}$).
6 The total suspended solids (TSS) in the reduction/co-precipitation reactor at the end of the test were 2290 mg/L with sulfide and 2053 mg/L without sulfide.
The residual iron in the reduction/co-precipitation reactor at the end of the test was 769 mg/L with sulfide and 134 mg/L without sulfide.

Examples 5 and 6

The data presented in Table 5 show the results of inhibition tests with limestone-based FGD scrubber purge waters at HADS levels of 2.5 and 5.0 mM/L. These data indicate that HADS will cause significant inhibition, even at relatively low concentrations in FGD scrubber purge wastewaters. Table 6 present data for the inhibiting effects of thiosulfate and a combination of thiosulfate and HADS in FGD scrubber purge wastewater. These data indicate that thiosulfate also will cause significant inhibition of selenium removal, albeit, to a lower degree than HADS for purge waters of the same chemistry. The combination of HADS and thiosulfate will basically shut down the process (at least for the 9.0 mM ferrous ion dose condition examined in these tests). The HADS results may have been influenced somewhat by the presence of nitrite, which was measured in the samples at between 10 and 20 mg/L. Nevertheless, it is clear that HADS inhibition will severely retard the rate of selenium removal from FGD scrubber purge waters.

In these tests, the presence of thiosulfate produced a sludge that was distinctly different from the dark green ferrous hydroxide solids that are typical of the reduction/co-precipitation-stabilization process. The thiosulfate tests produced black metal-sulfide-like sludges that were similar to what was observed under the test conditions presented in Table 4. It may be that the ferrous ion is also reducing the thiosulfate and precipitating as ferrous sulfide and ferric hydroxide in the reactor. Consequently, part of the inhibiting effect of thiosulfate may simply be the result of removal of the ferrous ion from solution. Likewise, HADS inhibits FGD scrubber purge water treatment by reductive destruction of the HADS, which results in the oxidation of the ferrous ion to the ferric form, making it unavailable for selenate/selenite reduction. These events occur through the mechanism of competitive inhibition. This effect is similar to what was observed by Moody and Murphy (1989) supra during treatment of selenium in agricultural drainage water with ferrous hydroxide in the presence of the nitrate ion. In their process, nitrate inhibits through ferrous ion oxidation as the nitrate is reduced to ammonia and nitrite.

TABLE 5

Inhibition Effects Due to the Presence of Sulfur-Nitrogen Compounds on Selenium Removal from FGD Scrubber Purge Water

| Time (minutes) | Test A - Control | | | Test B 2.5 mM/L HADS | | | Test C - 5.0 mM/L HADS | | |
|---|---|---|---|---|---|---|---|---|---|
| | pH | ORP (mV) | Temp. (° F.) | pH | ORP (mV) | Temp. (° F.) | pH | ORP (mV) | Temp. (° F.) |
| 0 | 8.9 | −420 | 101 | 9.05 | −173 | 100 | 9.1 | −300 | 98 |
| 5 | 9.0 | −420 | 101 | 9.07 | −385 | 99 | 9.0 | −230 | 98 |
| 10 | 9.0 | −520 | 100 | 9.11 | −381 | 99 | 8.9 | −170 | 99 |
| 15 | 9.0 | −540 | 100 | 9.12 | −382 | 99 | 8.9 | −210 | 98 |
| 20 | 9.1 | −560 | 99 | 9.13 | −380 | 98 | 8.9 | −240 | 98 |
| 30 | 9.1 | −590 | 98 | 9.19 | −381 | 97 | 8.9 | −160 | 97 |
| Reactor TSS at 30 minutes | 3,900 mg/L | | | 4,460 mg/L | | | 4,070 mgL | | |
| Decant TSS after 120 minutes of settling | 140 mg/L | | | 110 mg/L | | | 50 mg/L | | |
| Initial Selenium - Soluble | 915 μg/L | | | 923 μg/L | | | 919 μg/L | | |
| Final Selenium - Soluble | 26.9 μg/L | | | 769 μg/L | | | 849 μg/L | | |
| Final Selenium - Total | 70.1 μg/L | | | 757 μg/L | | | 911 μg/L | | |

TABLE 5-continued

Inhibition Effects Due to the Presence of Sulfur-Nitrogen Compounds on Selenium Removal from FGD Scrubber Purge Water

| Time (minutes) | Test A - Control | | | Test B 2.5 mM/L HADS | | | Test C - 5.0 mM/L HADS | | |
|---|---|---|---|---|---|---|---|---|---|
| | pH | ORP (mV) | Temp. (° F.) | pH | ORP (mV) | Temp. (° F.) | pH | ORP (mV) | Temp. (° F.) |

1. HADS is hydroxyalime disulfonate.
2. The present conversion of HDS from its precursor compounds was approximately 70%.
3. The tests were performed on synthetic FGD scrubber purge water spiked with 1.0 mg/L of selenium as selenate.
4. Nitrite was present in the HADS contaminated purge waters at 10 mg/L of nitrogen for the 2.5 mM/L HADS sample and 20 mg/L of nitrogen for the 5.0 mM/L HADS sample.
5. Treated purge water with 9.0 mM/L of iron as ferrous sulfate.
6. Used lime for initial pH adjustment and control during the selenium removal test.

TABLE 6

Inhibition Effects Due to the Presence of Thiosulfate Sulfur-Nitrogen Compounds on Selenium Removal from FGD Scrubber Purge Water

| Time (minutes) | Test D - 7.5 mM/L Thiosulfate | | | Test B - 15.0 mM/L Thiosulfate | | | Test F - 5.0 mM/L HADS and 15.0 mM/L Thiosulfate | | |
|---|---|---|---|---|---|---|---|---|---|
| | pH | ORP (mV) | Temp. (° F.) | pH | ORP (mV) | Temp. (° F.) | pH | ORP (mV) | Temp. (° F.) |
| 0 | 9.08 | −335 | 97 | 9.1 | −330 | 98 | 9.08 | −184 | 99 |
| 5 | 9.13 | −438 | 97 | 9.0 | −430 | 98 | 9.16 | −219 | 99 |
| 10 | 9.10 | −441 | 97 | 9.0 | −430 | 98 | 9.09 | −240 | 99 |
| 15 | 9.08 | −447 | 97 | 9.2 | −440 | 98 | 9.19 | −230 | 99 |
| 20 | 9.12 | −449 | 97 | 9.2 | −450 | 98 | 9.13 | −205 | 98 |
| 30 | 9.10 | −452 | 96 | 9.0 | −430 | 96 | 9.13 | −215 | 97 |
| Reactor TSS at 30 minutes | 4,020 mg/L | | | 3,680 mg/L | | | 3,720 mgL | | |
| Decant TSS after 120 minutes of settling | 90 mg/L | | | 240 mg/L | | | 300 mg/L | | |
| Initial Selenium - Soluble | 912 µg/L | | | 877 µg/L | | | 867 µg/L | | |
| Final Selenium - Soluhle | 567 µg/L | | | 664 µg/L | | | 814 µg/L | | |
| Final Selenium - Total | 583 µg/L | | | 677 µg/L | | | 914 µg/L | | |

1. HADS is hydroxyalime disulfonate.
2. The present conversion of HDS from its precursor compounds was approximately 70%.
3. The tests were performed on synthetic FGD scrubber purge water spiked with 1.0 mg/L of selenium as selenate.
4. Nitrite was present in the HADS contaminated purge waters at 10 mg/L of nitrogen for the 5.0 mM/L HADS/15.0 mM/L thiosulfate sample.
5. Treated purge water with 9.0 mM/L of iron as ferrous sulfate.
6. Used lime for initial pH adjustment and control during the selenium removal test.

Example 7

The data presented in Table 7 show the results of inhibition tests with limestone-based FGD scrubber purge waters when 100, 200, and 400 mg/L of trithionate is added to the samples. The test results indicate that the apparent inhibition is proportional to the concentration of trithionate present in solution. The remaining selenium in the purge wastewater is probably present as selenotrithionate, a complex ion. It is known that the addition of the thiosulfate ion displaces sulfite from selenotrithionate to give selenopentathionate, as follows:

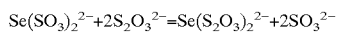

$$Se(SO_3)_2^{2-} + 2S_2O_3^{2-} = Se(S_2O_3)_2^{2-} + 2SO_3^{2-}$$

Solutions of selenopentathionate undergo slow decomposition to produce elemental selenium and the tetrathionate ion. This process probably accounts for the loss of selenium from nonforced-oxidized FGD scrubber purge waters when these waters are retained in surface impoundments at ambient temperature for several weeks or more. Usually, the presence of selenopentathionate and selenotrithionate in FGD scrubber purge water will serve to increase the concentration of dissolved selenium unavailable for reduction by the ferrous ion. Therefore, it is surmised that inhibitions due to the formation of selenium-thionate complexes are intensified by the presence of thiosulfate in the FGD scrubber purge water. In accordance with the current invention, it has been shown that an oxidative pretreatment that converts the thiosulfate to sulfate will reduce or effectively eliminate inhibitions due to selenium-thionate complexation.

TABLE 7

Inhibition Effects Due to the Presence of Trithionate on Selenium Removal from FGD Scrubber Purge Water.

| Time (minutes) | Test A - 100 mg/L Trithionate | | | Test B - 200 mg/L Trithionate | | | Test C - 400 mg/L Trithionate | | |
|---|---|---|---|---|---|---|---|---|---|
| | pH | ORP (mV) | Temp. (° F.) | pH | ORP (mV) | Temp. (° F.) | pH | ORP (mV) | Temp. (° F.) |
| 0 | 9.0 | −740 | 97 | 8.97 | −761 | 96 | 9.2 | −580 | 98 |
| 5 | 9.0 | −700 | 97 | 8.81 | −733 | 95 | 9.2 | −580 | 98 |
| 10 | 9.0 | −710 | 96 | 9.10 | −745 | 95 | 9.1 | −580 | 98 |
| 20 | 9.0 | −720 | 95 | 8.94 | −726 | 94 | 9.0 | −600 | 98 |
| 30 | 8.9 | −720 | 94 | 8.87 | −723 | 93 | 9.0 | −640 | 96 |
| TSS in Reactor at 30 min. | 1,750 mg/L | | | 2,020 mg/L | | | 2,360 mg/L | | |
| TSS after Settling 120 min. | 310 mg/L | | | 323 mg/L | | | 368 mg/L | | |
| Initial Selenium - Soluble | 877 μg/L | | | 898 μg/L | | | 869 μg/L | | |
| Final Selenium - Solute | 31.9 μg/L | | | 57.4 μg/L | | | 142 μg/L | | |
| Final Selenium - Total | 32.7 μg/L | | | 71.5 μg/L | | | 142 μg/L | | |

1. Testing was performed using synthetic FGD scrubber purge water.
2. Ferrous Sulfate was applied to the test reactors at 9.0 mmoles/L.

Example 8

The data presented in Table 8 show the results of HADS destruction in the presence of the free hydroxyl radical for limestone-based FGD scrubber purge waters. The free hydroxyl radical was formed using Fenton's reaction. The test results indicate that the HADS compound at initial concentrations between 9.4 and 10.2 mM/L were completely destroyed within five hours of the start of the Fenton's reaction, with greater than 75 percent of the destruction occurring in the first hour of the oxidation. Pretreatment using the free hydroxyl radical can be conducted at a pH between 1.0 and 4.0, but is most optimal at a pH about 3.0 to 4.0 and at a temperature between 40 and 50° C. for purge waters from limestone-based FGD scrubbers. The free hydroxyl radical dose that was observed to be most effective at removing the HADS compound from FGD scrubber purge water was approximately 30 mM/L. Inhibition of the selenium reduction/co-precipitation-stabilization process is effectively removed when HADS concentrations are less than 0.5 mM/L in FGD scrubber purge waters.

TABLE 8

HADS Destruction using the Free Hydroxyl Radical

| Time (Hours) | Test A[3,4] - 100 mg/L $Fe^{2+}$ | | | Test B[3,4] - 200 mg/L $Fe^{2+}$ | | | Test C[3,4] - 300 mg/L $Fe^{2+}$ | | |
|---|---|---|---|---|---|---|---|---|---|
| | pH | ORP (mV) | Temperature (° F.) | pH | ORP (mV) | Temperature (° F.) | pH | ORP (mV) | Temperature (° F.) |
| T = 0[2] | 4.1 | 440 | 120 | 3.98 | 314 | 120 | 4.2 | 160 | 120 |
| T = 1.0 | 2.7 | 510 | 113 | 4.34 | 361 | 113 | 4.18 | 404 | 121 |
| T = 3.0 | 0.9 | 680 | 110 | 2.05 | 580 | 109 | 1.63 | 658 | 108 |
| T = 5.0 | 1.1 | 680 | 115 | 1.97 | 395 | 112 | 1.40 | 711 | 112 |
| T = 8.0 | 1.3 | 700 | 109 | 1.90 | 518 | 106 | 1.35 | 740 | 99 |
| Nitrate Initial[1] | <2 mg/L | | | <2 mg/L | | | 2 mg/L | | |
| Nitrate Final | 54 mg/L | | | 54 mg/L | | | 46 mg/L | | |
| HADS Initial[1] | 9.4 mM/L | | | 9.6 mM/L | | | 10.2 mM/L | | |
| HADS T = 0[2] | 9.8 mM/L | | | 6.0 mM/L | | | 2.3 mM/L | | |
| HADS T = 1.0 hr | 2.0 mM/L | | | 2.5 mM/L | | | 2.4 mM/L | | |
| HADS T = 3.0 hrs | 0.6 mM/L | | | 0.8 mM/L | | | 0.8 mM/L | | |
| HADS T = 5.0 hrs | 0 | | | 0 | | | 0 | | |

[1]Constituent analysis before the addition of hydrogen peroxide.
[2]Constituent analysis after the initial addition of hydrogen peroxide.
[3]Hydrogen peroxide was delivered in seven increments for a total of 2,500-mg (1,000 mg/L).
[4]Ferrous ion was delivered as ferrous sulfate heptahydrate ($FeSO.7H_2O$) in seven increments.

Process Performance

Figure 2:
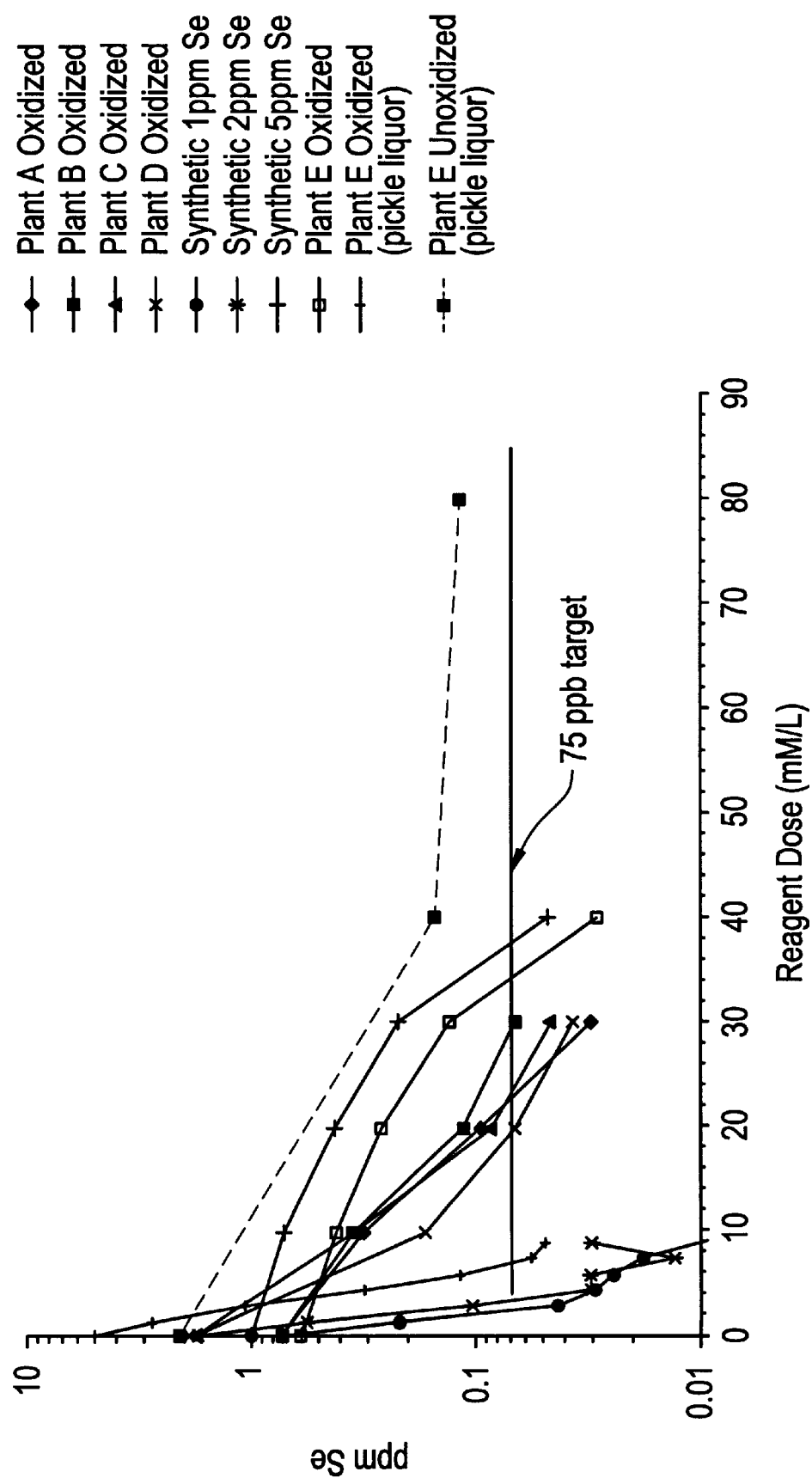
FIG. 2 is a graph depicting selenium treatment performance as a function of reagent dosage.

The graphical showing in FIG. 2 presents the selenium removal test results for a variety of pretreated and raw FGD scrubber purge wastewaters. These test data represent the performance of the reduction/co-precipitation-stabilization process when applied to the treatment of scrubber purge waters from (1) several different existing forced-oxidation FGD systems; (2) a synthetic (idealized) forced-oxidation FGD source; and (3) an existing nonforced-oxidation FGD system. In all of these cases, selenium was present as selenate in the FGD scrubber purge water. Generally, these data show that depending on the inhibitory conditions that exist with the individual FGD scrubber purge wastewaters, the amount of reagent (i.e., ferrous ion) required to achieve the effluent selenium regulatory target will vary greatly. Treated purge waters from forced-oxidation FGD systems (Plants A, B, C, and D) required 20 to 30 mM/L of the ferrous ion to achieve the target selenium concentration. These FGD systems are largely free of reduced sulfur compounds, but will contain HADS at elevated concentrations (e.g., 1 to 9 mM/L). The idealized forced-oxidation FGD source (synthetic) purge wastewaters, which are generally free of inhibitory substances, required less than 10 mM/L of ferrous ion to achieve the regulatory target. The synthetic FGD scrubber purge waters achieved the regulatory target at this low reagent dose even though treating five times the initial selenium concentration found in actual FGD system purge waters.

With the nonforced-oxidation FGD system purge waters (Plant E), three conditions were examined. These were (1) treatment with ferrous sulfate after pretreatment with the free hydroxyl radical (Plant E Oxidized); (2) treatment with pickle liquor after pretreatment with the free hydroxyl radical (Plant E Oxidized—pickle liquor); and (3) treatment with pickle liquor without pretreatment (Plant E Unoxidized—pickle liquor). The test data indicate that a nonforced-oxidation FGD system purge water cannot be treated to the regulatory target without pretreatment with an appropriate oxidant, even at reagent dose levels as high as 80 mM/L. However, when pretreatment with the free hydroxyl radical is performed on these purge waters prior to implementation of the reduction/co-precipitation-stabilization process, the regulatory target can be met at reagent dose levels of between 35 and 40 mM/L. This condition was achieved using either ferrous sulfate or pickle liquor (i.e., ferrous chloride) as process reagents.

The Plant E Unoxidized case represents a condition were inhibition was caused by a combination of reduced sulfur compounds, mainly thiosulfate and trithionate, and HADS. The pretreatment with the free hydroxyl radical was sufficient to overcome the majority of this inhibition, albeit, still leaving lower levels of HADS residue in the purge water, which continued to show a retardant condition. This retardant condition can be overcome in accordance with the present invention by making the appropriate adjustments in the operating conditions of the pretreatment reaction system. These adjustments would include, but would not be limited to, changes in pH, oxidant type and/or dose, and the hydraulic retention time of the pretreatment reactor.

While the present invention has been described in terms of specific embodiments thereof, it will be understood in view of the present disclosure that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A method for removing the oxy-anions of selenium from FGD scrubber purge water comprising the sequential steps of:

(a) contacting the purge water with free hydroxyl radicals to effect oxidation of reduced forms of sulfur to sulfate and the destruction of sulfur-nitrogen compounds present in the purge water;

(b) chemically reducing and co-precipitating selenium with an amount of ferrous ions effective to remove the oxy-anions of selenium in the purge water from step (a) in less than 30 minutes of reaction time; and (c) separating the resultant ferrous-selenium solids generated during step (b) for stabilization to elemental selenium in a separate reaction vessel.

2. A method in accordance with claim 1 wherein step (a) is conducted at a pH of about 3.0 to 4.0 and at a temperature between 40 and 50° C.; step (b) is conducted at a pH of about 8.8 to 9.2 and at a temperature greater than 35° C.; and step (c) is conducted at a pH of about 9.0 to 9.2 and at a temperature greater than 35° C.

3. The method of claim 1, wherein step (a) is performed at free hydroxyl radical doses between 20 and 30 mM/L for effective oxidation of sulfite, bisulfite, sulfide, thiosulfate and other reduced forms of sulfur to sulfate, and the destruction of the sulfur-nitrogen compound HADS in the FGD scrubber purge wastewater.

4. The method of claim 1, wherein the chemical reduction and co-precipitation of selenium in step (b) is performed at ferrous ion doses between 10 and 40 mM/L.

5. The method of claim 1, wherein the chemical reduction and co-precipitation of selenium in step (b) is performed under strict anaerobic conditions at ORP readings less than −650 mV.

6. The method of claim 1, wherein the chemical reduction and co-precipitation of selenium in step (b) is performed in the presence of calcium sulfate and sulfite solids.

7. The method of claim 1, wherein the ferrous ions are provided as waste by-product-pickling liquor.

8. The method of claim 7, wherein the said liquor is hydrochloric acid-based pickle liquor.

9. The method of claim 1, wherein the ferrous ions are provided, at least in part, by the recycle of stabilized ferrous-selenium sludge either as slurry from a stabilization reaction vessel or as cake from a sludge dewatering unit to a first reduction/co-precipitation reactor.

10. The method of claim 9, wherein the said first reduction/co-precipitation reactor is operated at about pH 3.0 to 4.0 to release ferrous ions for the reduction of the oxy-anions of selenium resulting in between 75 and 85 percent less virgin ferrous reagent use, and a lowering of the overall solids disposal requirement for the process of greater than 75 percent.

11. The method of claim 1, wherein a HADS compound is not present in the purge water, and step (a) is performed using oxidizing agents with the formula $Na_aClO_b$ at a pH of about 5.7 to 6.5 and at a temperature between 40 and 50° C.

12. The method of claim 11, wherein the dosages of the oxidizing agents of the formula $Na_aClO_b$ are between 5 and 10 mM/L.

* * * * *